(12) United States Patent
Kim et al.

(10) Patent No.: US 9,372,274 B2
(45) Date of Patent: Jun. 21, 2016

(54) APPARATUS AND METHOD FOR 3D SEISMIC EXPLORATION FOR USE IN A SMALL SHIP

(71) Applicants: Korea Institute of Geoscience and Mineral Resources, Daejeon (KR); GeoView Co. Ltd., Busan (KR)

(72) Inventors: Won Sik Kim, Daejeon (KR); Jong Myung Park, Daejeon (KR); Ho Young Lee, Daejeon (KR); Young Jun Kim, Daejeon (KR); Hyun Do Kim, Busan (KR)

(73) Assignees: KOREA INSTITUTE OF GEOSCIENCE AND MINERAL RESOURCES, Daejeon (KR); GEOVIEW CO. LTD., Busan (KR)

( * ) Notice: Subject to any disclaimer, the term of this patent is extended or adjusted under 35 U.S.C. 154(b) by 0 days.

(21) Appl. No.: 14/691,926

(22) Filed: Apr. 21, 2015

(65) Prior Publication Data

US 2016/0124104 A1    May 5, 2016

(51) Int. Cl.
*G01V 1/38* (2006.01)
*G01V 1/20* (2006.01)

(52) U.S. Cl.
CPC .............. *G01V 1/3808* (2013.01); *G01V 1/201* (2013.01); *G01V 1/3826* (2013.01); *G01V 2001/204* (2013.01)

(58) Field of Classification Search
CPC .............. G01V 1/38; G01V 1/09; G01V 1/20; G01V 1/30; G01V 1/34
See application file for complete search history.

(56) References Cited

U.S. PATENT DOCUMENTS

2013/0088937 A1* 4/2013 Sykes .................. G01V 1/3826
                                                    367/16

FOREIGN PATENT DOCUMENTS

KR        2009-0081146 A        7/2009

* cited by examiner

*Primary Examiner* — Krystine Breier
(74) *Attorney, Agent, or Firm* — Dentons US LLP (57) ABSTRACT

An apparatus and method for 3D seismic exploration for use in a small ship. The apparatus includes a seismic source towed by the small ship from a rear side thereof, a pair of support rods connected to the rear side and horizontally arranged in two rows behind the seismic source in the direction extending from a sailing direction of the ship, and a plurality of streamers arranged between the support rods in the sailing direction of the ship.

6 Claims, 8 Drawing Sheets

APPARATUS AND METHOD FOR 3D SEISMIC EXPLORATION FOR USE IN A SMALL SHIP

CROSS REFERENCE TO RELATED APPLICATION

This application claims the benefit of Korean Patent Application No. 10-2014-0152208, filed on Nov. 4, 2014, which is hereby incorporated by reference in its entirety into this application.

BACKGROUND OF THE INVENTION

1. Field of the Invention

The present invention generally relates to 3-dimensional seismic exploration for oil, for example. More particularly, the present invention relates to an apparatus and method for 3-dimensional seismic exploration, which is precisely carried out even in a small ship.

2. Description of the Related Art

Generally, marine seismic explorations are carried out by an exploration vessel sailing on the sea, with seismic sources and streamers having hydrophones located behind the vessel, while sending seismic waves into the geological structures in the seabed, and collecting and analyzing the reflected seismic waves, thereby surveying the geological structures.

For such seismic exploration, an ocean bottom cable type streamer disclosed in Korean Patent Application Publication No. 10-2012-0076952, a streamer having a wing, a protecting casing, a loss-prevention means, and a water level-maintaining means, which is disclosed in Korean Patent Application Publication No. 10-2013-0134822, a multi-wave seismic exploration apparatus disclosed in Korean Patent No. 10-1016014, and a technology for converting collected reflected seismic waves into an ODCE file, which is disclosed in Korean Patent No. 10-1230040, are employed.

Seismic exploration using such apparatuses may be divided into 2D or 3D exploration depending upon whether a single streamer or two or more streamers were used. While 2D exploration acquires data of a vertical cross-section of subsurface geological structures, 3D exploration acquires data of a 3-dimensionally imaged cubic area of subsurface geological structures. Since subsurface geological structures actually have a 3-dimensional structure, 3D exploration is advantageous relative to 2D exploration in surveying subsurface geological structures. For 3D exploration, however, generally two or more rows of streamers are needed, so 3D exploration can only be done by a very large vessel.

In 3D seismic exploration using very large vessels such as an oil-exploration ship, the vessel moves over the sea with generally two or more rows of streamers launched, each of which extends a few kilometers or more, so, even when the streamers meet tidal current, they can be checked in their linearity and relative positions by means of several GPSs, due to their tension.

However, in the case of 3D seismic exploration using a small ship, if relatively short streamers of about 10 m, but not relatively long streamers of about 100 m, are used for the acquisition of 3D exploration data, the short streamers have little tension, so, if in a tidal current, they cannot be maintained at regular relative-positions.

Figure 1A:
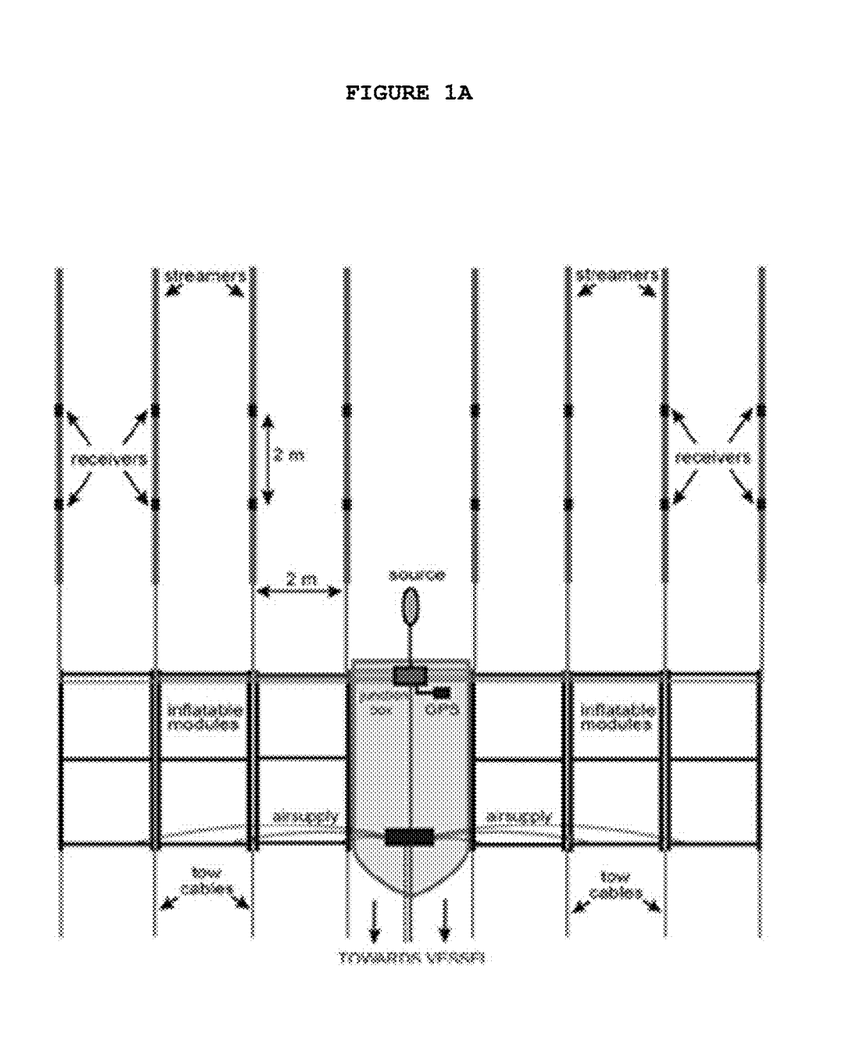
FIGS. 1A and 1B are views showing the construction of a conventional 3D seismic exploration apparatus for a small ship.
Figure 1B:
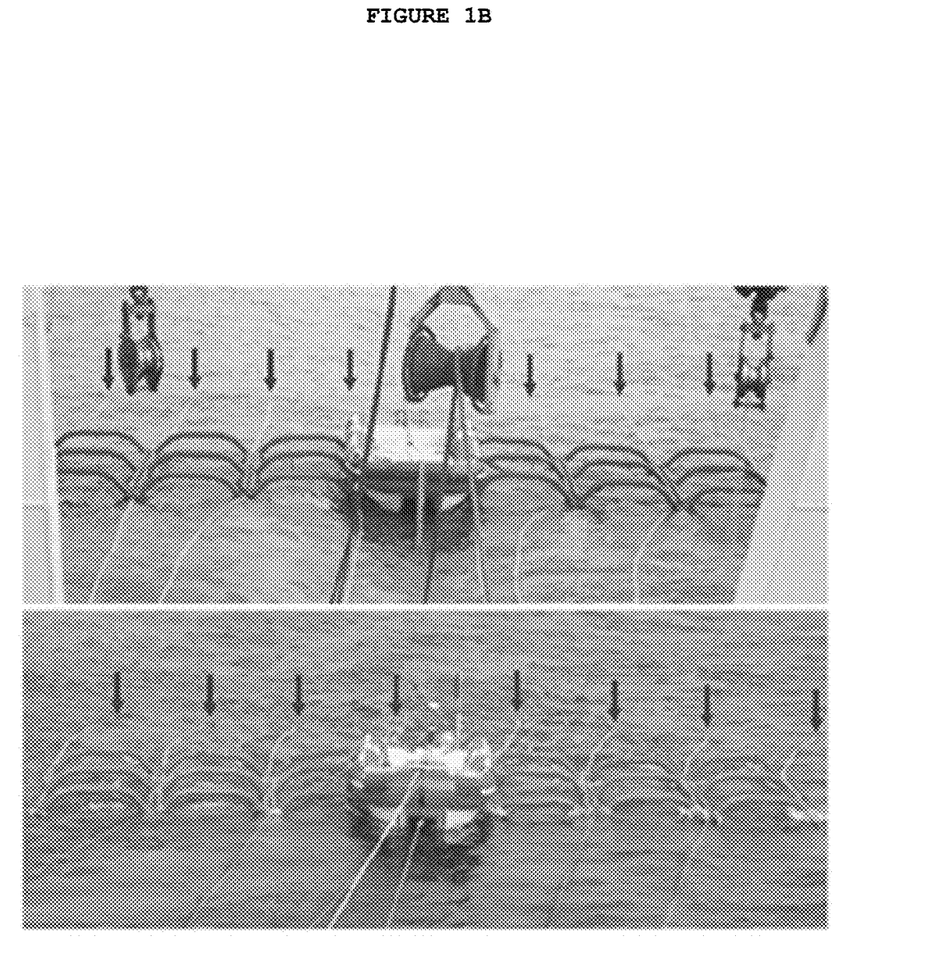

FIGS. 1A and 1B show a conventional example of a 3D seismic exploration apparatus using a small ship. As shown in FIG. 1A, the 3D seismic exploration apparatus tows several 8$m$-streamers at a distance of 2 m, so as to acquire 3D seismic exploration data.

FIG. 1B shows two photographs, wherein an upper photograph illustrates seismic exploration in a river and a lower photograph illustrates seismic exploration at sea. As shown in the two photographs of FIG. 1B, in the sea region with a tidal current, the distance between the streamers is not constant as shown with the arrow, thus failing to obtain a precise 3D seismic image.

Further, compared to very large vessel sailing at about 5 knots for seismic exploration, a small ship sails at about 3 to 4 knots for seismic exploration. However, depending on the exploration direction, the water speed may often be less than 2 knots, making it difficult to maintain a constant distance between the streamers.

Accordingly, such problems should be overcome in order to facilitate 3D seismic exploration using a small ship.

The foregoing is intended merely to aid in the understanding of the background of the present invention, and is not intended to mean that the present invention falls within the purview of the related art that is already known to those skilled in the art.

Documents of Related Art (Patent Document 1) Korean Patent Application Publication No. 10-2012-0076952

(Patent Document 2) Korean Patent Application Publication No. 10-2013-0134822

(Patent Document 3) Korean Patent No. 10-1016014

(Patent Document 4) Korean Patent No. 10-1230040

SUMMARY OF THE INVENTION

Accordingly, the present invention has been made keeping in mind the above problems occurring in the related art, and the present invention is intended to propose an apparatus and method for 3D seismic exploration, which is performed using a small ship such that relatively short streamers towed by the ship maintain constant relative positions and water level.

Another object of the present invention is to provide an apparatus and method for 3D seismic exploration, which is precisely performed using a small ship such that relatively short streamers are provided so that relative positions between hydrophones attached thereto and relative positions to a seismic source are fixedly maintained.

In order to achieve the above object, according to one aspect, the present invention provides an apparatus for 3D seismic exploration for use in a small ship, the apparatus including: a seismic source towed by the small ship from a rear side thereof; a pair of support rods connected to the rear side and horizontally arranged in two rows behind the seismic source in the direction extending from a sailing direction of the ship; and a plurality of streamers arranged between the support rods in the sailing direction of the ship.

The streamers may consist of three or more streamers for the acquisition of a 3D seismic image.

The support rod may have, at regular intervals, a plurality of coupling holes into which ends of streamers are fixedly inserted.

The support rod may be provided with a plurality of connection rod parts, with the coupling hole for the streamer disposed at a middle portion thereof, the connection rod parts being coupled to form the support rod able to variably extend in the horizontal direction.

The support rod may have, on opposite sides thereof, GPS devices for sending position data of the support rod so as to check the position of the streamers.

The apparatus may further include: a coupling rod connected to a rear side one of the two support rods through the coupling hole thereof; and a resisting plate with a specified surface area, connected to the rear side support rod via the coupling rod so as to offer a resisting force against water opposite the sailing direction of the ship to the rear side support rod, allowing the streamers to be tensioned and maintained at regular intervals.

In another aspect, the present invention provides a method for 3D seismic exploration using a 3D seismic exploration apparatus for use in a small ship, the apparatus including a seismic source towed by the small ship from a rear side thereof and a pair of support rods, between which opposite sides of streamers arranged in rows are supported, the method including: fixedly coupling the opposite sides of the streamers between the support rods; and performing the 3D seismic exploration by emitting seismic waves and collecting analyzing reflected seismic waves, while towing the streamers.

The method may further include: tensioning the streamers arranged in rows by connecting a resisting body to and offering a resisting force to one of the two support rods positioned in the rear side from the sailing direction of the ship.

According to the present invention, even when towed by a small ship, e.g. three rows of relatively-short streamers are maintained at regular relative-intervals, facilitating precise, easy acquisition of 3D marine seismic exploration data about subsurface geological structures.

Further, the present invention facilitates 3D seismic exploration in a small ship, which enables 3D seismic exploration in regions where it is difficult for a very large vessel to approach and acquire 3D seismic exploration data.

Further, the present invention facilitates easy, precise and economical acquisition of 3D in-situ seismic exploration data about subsurface geological structures under the sea for e.g. engineering purposes, compared to a conventional 3D seismic exploration manner.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE PRESENTLY PREFERRED EMBODIMENTS OF THE INVENTION

Exemplary embodiments of the present invention will be described more fully hereinafter with reference to the accompanying drawings.

In the following description of the present invention, detailed descriptions of known functions and components incorporated herein will be omitted when it may make the subject matter of the present invention unclear.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 2:
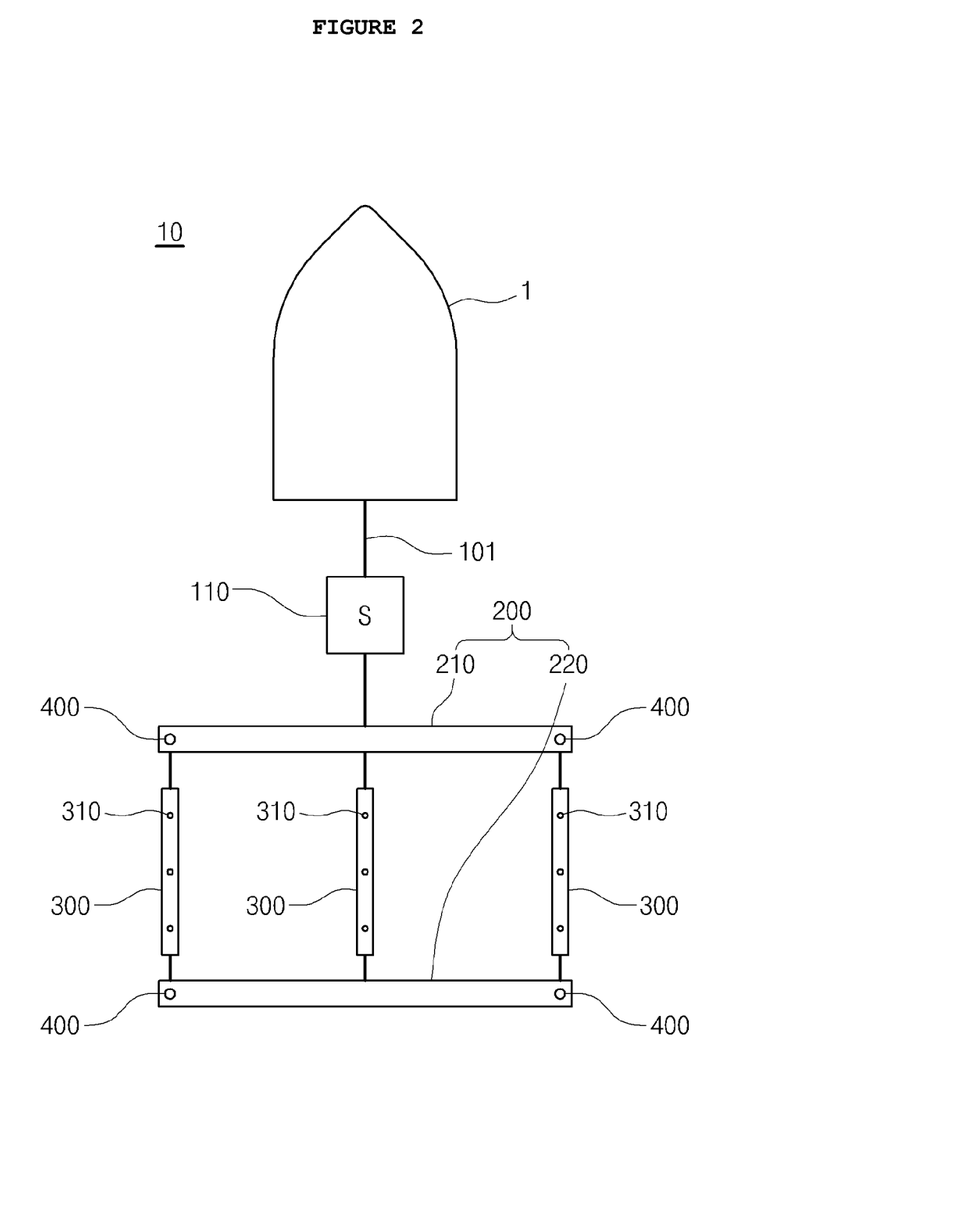
FIG. 2 is a view showing the construction of a 3D seismic exploration apparatus for a small ship according to an embodiment of the present invention.

FIG. 2 is a view showing the construction of a 3D seismic exploration apparatus 10 (also referred hereinafter to as a 'seismic exploration apparatus') according to an embodiment of the present invention.

As shown in FIG. 2, the seismic exploration apparatus 10 includes a seismic source 110 that is towed by a small ship 1 from the rear side thereof, a pair of support rods 200 connected to the rear side of the small ship 1 and are arranged in two rows in the rear side of the seismic source 110 in the opposite direction to a sailing direction of the ship, wherein the support rods consist of a front support rod 210 and a rear support rod 220, and a plurality of streamers 300 between the support rods 200 in the sailing direction of the ship 1. The support rod 200 is provided, on opposite sides thereof, with GPS devices 400.

As shown in FIG. 2, the two GPS devices 400 are attached to the opposite sides of the support rods, or otherwise three or more GPS devices may be attached to the support rods at regular intervals. As set forth, the GPS devices 400 serve to check a reference position of the 3D seismic exploration apparatus 10.

The above-mentioned seismic source 110 may include an air gun and the like to generate seismic waves via e.g. the supply of compressed air.

The streamers 300 each contain hydrophones 310 at regular intervals so as to receive or collect 3D seismic waves reflected from subsurface geological structures under the sea. The streamers 300 may each have a length of about 3 m to 100 m.

The support rod 200 serves to support the streamers 300 to be maintained at regular intervals, and may be of horizontally-variable length by horizontally connecting a plurality of connection rod parts 211 (see FIG. 3) together. This configuration provides easy connection of the support rod and easy enlargement of a horizontal exploration area.

Connection rod parts 211 and 211a will now be described in detail with reference to FIGS. 3 and 4.

Figure 3:
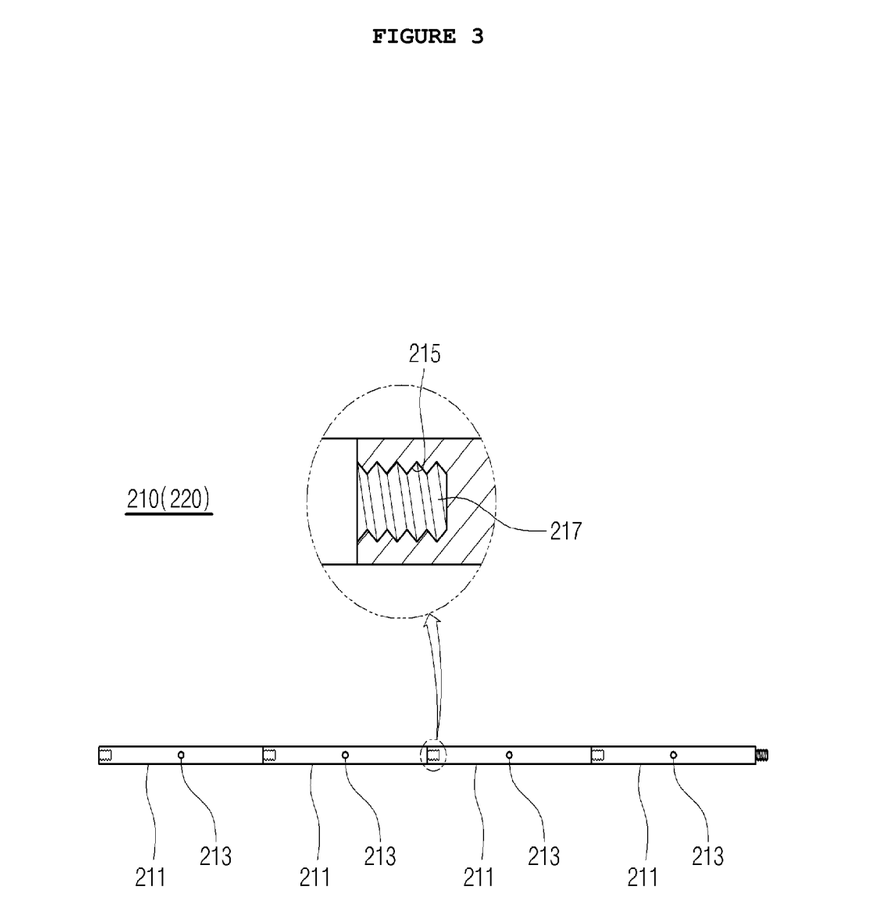
FIG. 3 is a view showing a support rod 210, 220 consisting of a plurality of first connection rod parts 211 to allow the support rod to variably extend in the horizontal direction.
Figure 4:
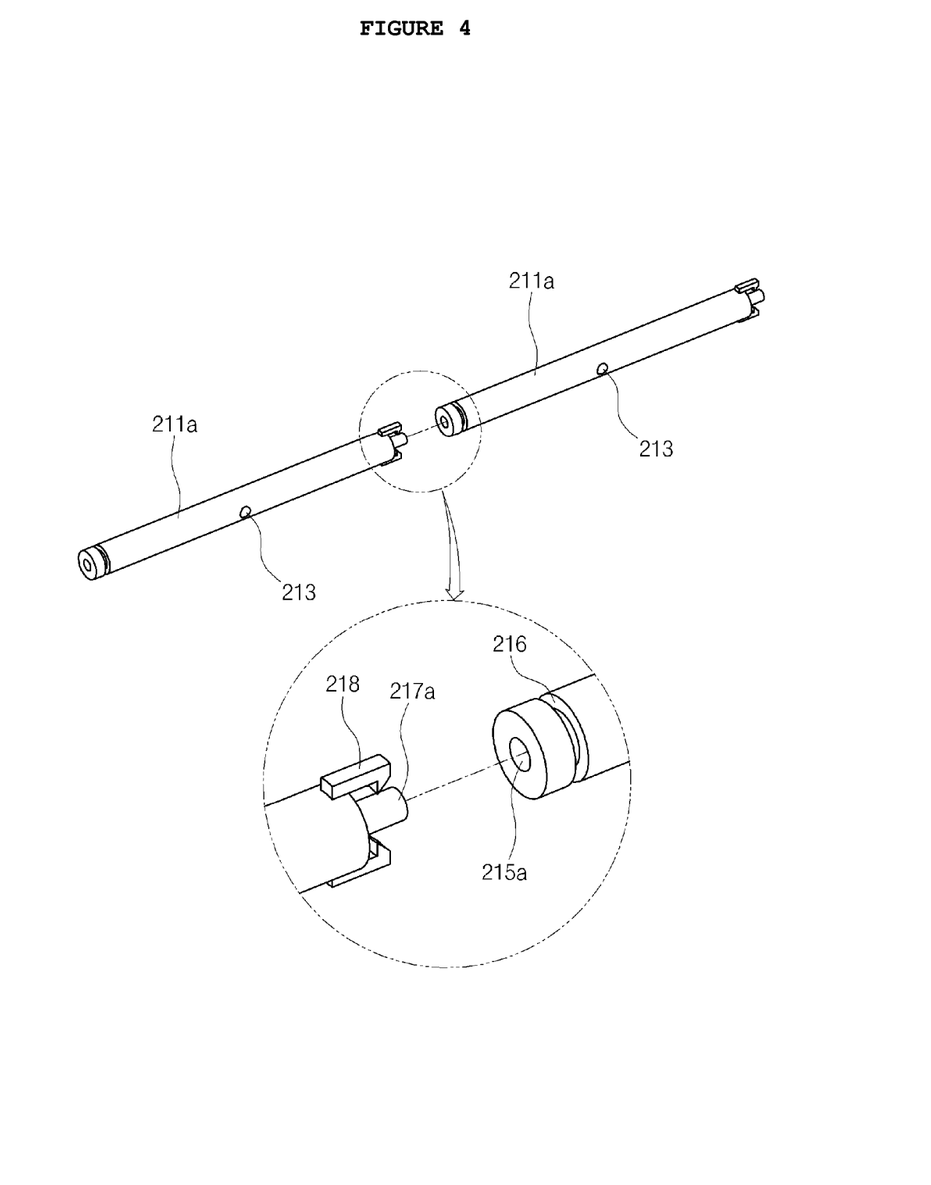
FIG. 4 is a perspective view showing a second embodiment of connection rod part 211a different from the above-mentioned connection rod part.

FIG. 3 is a view showing the support rods 210 and 220 consisting of a plurality of first connection rod parts 211 to allow the support rod to variably extend in the horizontal direction, and FIG. 4 is a perspective view showing a second embodiment of connection rod part 211a different from the above-mentioned connection rod part.

Referring to FIG. 3, the first connection rod part 211 has a coupling hole 213 for the streamer at a middle portion thereof. The first connection rod part 211 may have mutually-engaging internal and external screw portions 215 217 on opposite sides, respectively.

That is, the support rod may be horizontally extended by screwing the external screw portion 217 of one first connection rod part 211 into the internal screw portion 215 of the adjoining first connection rod part 211, thus allowing the number of the streamers to be connected to increase. This increases a seismic exploration area obtained at a time and also increases the precision of the seismic exploration.

The connection rod parts may be connected together in a variety of different connection manners. For example, FIG. 4 shows the second embodiment of connection rod part 211a that is different from the above-mentioned connection rod part. The second embodiment of connection rod part 211a may have mutually-engaging bossed groove 215a and protruding insert 217a on opposite sides thereof, respectively. Here, the connection rod parts 211a are coupled by connecting the protruding insert 217a of one connection rod part 211a into the bossed groove 215a of the adjoining connection rod part 211a. Further, in order to prevent the disengagement of the adjoining connection rod parts 211a that were connected, the bossed groove 215a and protruding insert 217a of the connection rod part may circumferentially have mutually engaging recess 216 and hook 218.

In the former construction shown in FIGS. 2 and 3, the coupling hole 213 of the first connection rod part 211 may be an internal screw portion and an end of the streamer to be coupled into the coupling hole may be an external screw portion.

Alternatively, the first connection rod part 211 and the streamer 300 may be connected in a variety of different manners. For example, as in the second embodiment of connection rod part 211a of FIG. 4, the coupling hole 213 may be provided with a protruding insert 217a and a hook 218 and the end of the streamer 300 may be provided with a bossed groove having an engaging recess 216 to be coupled with the hook 218.

Further, in addition to the configurations including the internal and external screw portion 215 and 217, the bossed groove 215a, the engaging recess 216, the protruding insert 217a, and the hook 218 for the horizontal connection between the connection rod parts, the connection rod parts 211 and 211a may selectively have other diverse disengagement-prevention means such as for fixing using fixing pins after inserting an end of the streamer.

The support rod 200 or the connection rod part 211, 211a may be formed from a buoyant material so as to float on the surface of water.

The seismic exploration apparatus 10 having the configuration shown in FIGS. 2 to 4 carries out the 3D seismic exploration, with the seismic source 110 connected to the rear side of the small ship 1, front and rear support rods 210 and 220 positioned in the rear side of the seismic source 110, and the plurality of streamers 300 positioned between the front and rear support parts 210 and 220 in the sailing direction of the ship coupled together while being towed by the ship as shown in FIG. 2.

In this process, the streamers 300 maintain a tensioned state while being positioned at regular intervals by the operation of the front and rear support rods 210 and 220. Such a tensioned state along with regular intervals in the streamers 300 enable 3D seismic exploration of the subsurface geological structures under the sea to be precise. To this end, the present invention may thus further include a resisting body to allow the streamers 300 to be tensioned so as to maintain a parallel state to each other.

Figure 5:
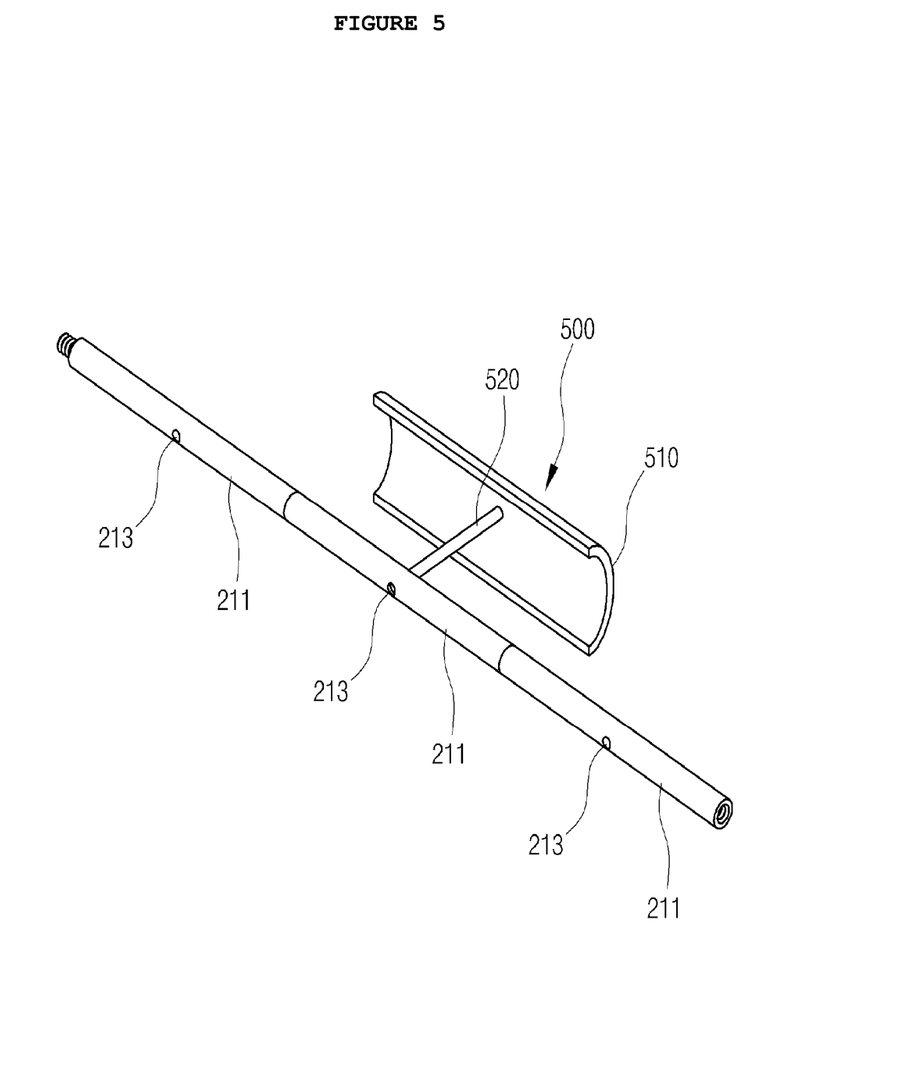
FIG. 5 is a view showing the construction of a resisting body or plate 500.
Figure 6:
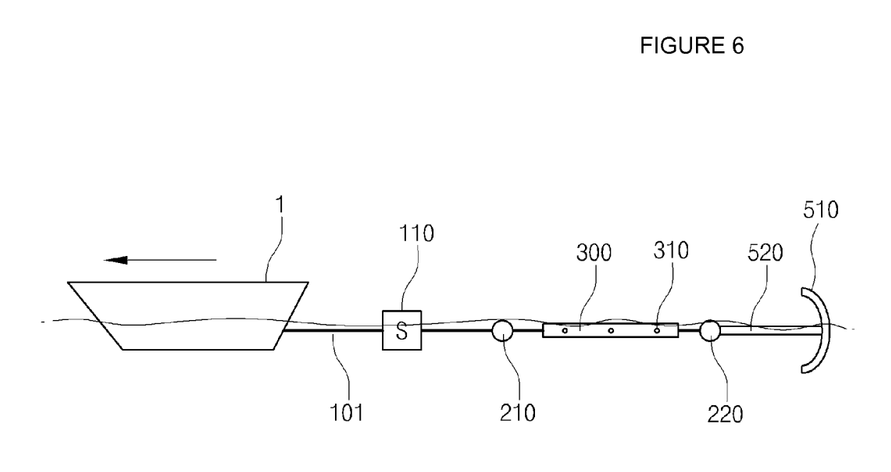
FIG. 6 is a view showing the state of the resisting body 500 being coupled to a rear side support rod 220.

FIG. 5 is a view showing the construction of the above-mentioned resisting body 500, and FIG. 6 is a view showing the resisting body 500 being coupled to the rear side support rod 220.

As shown in FIG. 5, the resisting body 500 includes a resisting plate 510 that generates a resisting force against water, and a coupling rod 520, opposite ends of which are coupled to the resisting plate 510 and the coupling hole 213 of the rear side support rod 220, respectively.

As shown in FIG. 6, the resisting body 500 is operated such that the resisting plate 510 connected to the rear side support rod 220 generates a resistance force against water opposite the sailing direction of the ship, tensioning the streamers 300 to be stretched while maintaining regular intervals therebetween, thereby facilitating precise 3D seismic exploration.

Further, the resisting plate 510 may have different shapes and sizes, as shown with an arched plate in FIG. 5 and with a cut angular tube or other forms, in order to provide a different amount of resisting force to suit to seismic explorations under different conditions.

Figure 7:
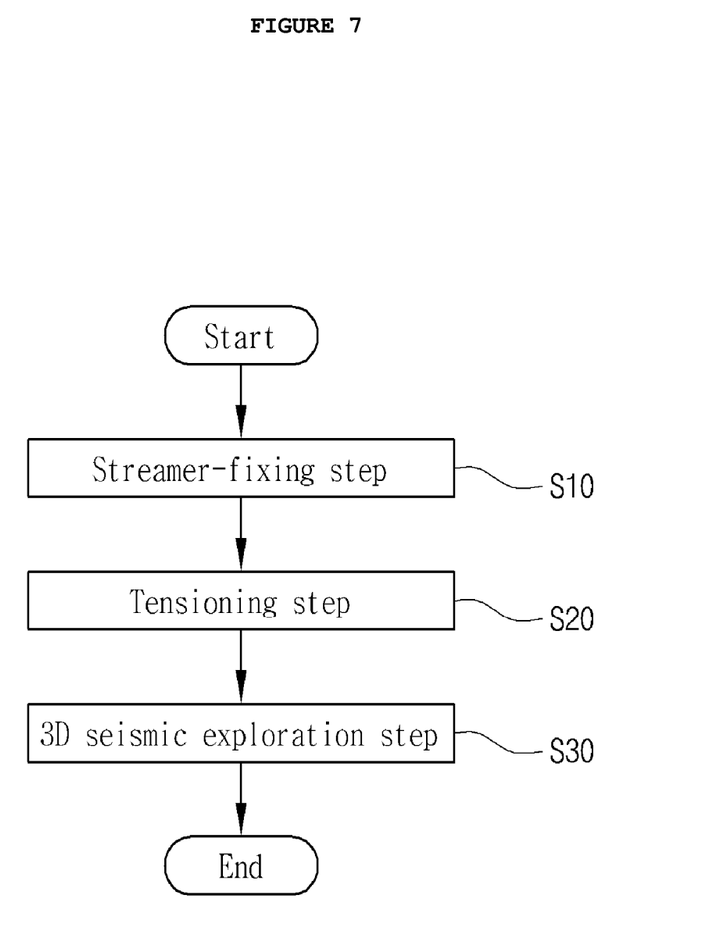
FIG. 7 is a flow chart showing a procedure of a 3D seismic exploration method according to an embodiment of the present invention.

FIG. 7 is a flow chart of a procedure of a 3D seismic exploration method according to an embodiment of the present invention.

As shown in FIG. 7, the 3D seismic exploration method is performed by using a 3D seismic exploration apparatus for a small ship, wherein the apparatus includes a seismic source towed by the small ship from a rear side thereof and a pair of support rods, between which opposite sides of streamers arranged in rows are supported. The method includes a streamer-fixing step (S10), a tensioning step (S20), and a 3D seismic exploration step (S30).

The streamer-fixing step (S10) is a step of fixedly coupling the opposite sides of the streamers 300 between the support rods 210 and 220 through the coupling holes 213 for streamers in order to maintain a constant distance between the streamers 300.

In the process, when it is required to further increase the exploration area and to improve the exploration accuracy, the support rods are enlarged by additionally connecting the connection rod parts 211, and then the streamers can be additionally attached thereto.

The tensioning step (S20) is a step of tensioning the streamers 300 by connecting the resisting body 500 to and offering a resisting force to one 220 of the two support rods 210 and 220 positioned in the rear side from the sailing direction of the ship 1. As the ship moves forward, the streamers 300 are further tensioned and tend to be maintained stretched and positioned at regular intervals, enabling more-precise 3D seismic exploration.

The 3D seismic exploration step (S30) is a step of performing 3D seismic exploration by emitting seismic waves and collecting and analyzing reflected seismic waves, while towing the streamers, after the streamers are fixed and tensioned as described above.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for 3D seismic exploration for use in a small ship, the apparatus comprising:
    a seismic source towed by the small ship from a rear side thereof;
    a pair of support rods connected to the rear side of the ship and horizontally arranged in two rows behind the seismic source in the direction extending from a sailing direction of the ship; and
    a plurality of streamers arranged between the support rods in the sailing direction of the ship,
    wherein,
        the streamers consist of three or more streamers for the acquisition of a 3D seismic image.

2. The apparatus according to claim 1, wherein the support rod has, at regular intervals, a plurality of coupling holes into which ends of streamers are fixedly inserted.

3. The apparatus according to claim 2, wherein the support rod is provided with a plurality of connection rod parts, with the coupling hole for the streamer disposed at a middle portion thereof, the connection rod parts being coupled to form the support rod able to variably extend in a horizontal direction.

4. The apparatus according to claim 1, wherein the support rod has, on opposite sides thereof, GPS devices for sending position data of the support rod so as to check the position of the streamers.

5. The apparatus according to claim 1, further comprising:
    a coupling rod connected to a rear side one of the two support rods through the coupling hole thereof; and
    a resisting plate with a specified surface area, connected to the rear side support rod via the coupling rod so as to offer a resisting force against water opposite the sailing direction of the ship to the rear side support rod, allowing the streamers to be tensioned and maintained at regular intervals.

6. A method for 3D seismic exploration using a 3D seismic exploration apparatus for use in a small ship, the apparatus comprising: a seismic source towed by the small ship from a rear side thereof; and a pair of support rods, between which opposite sides of streamers arranged in rows are supported, the method comprising:
    fixedly coupling the opposite sides of the streamers between the support rods;
    tensioning the streamers arranged in rows by connecting a resisting body to and offering a resisting force to one of the two support rods positioned in the rear side from the sailing direction of the ship; and
    performing the 3D seismic exploration by emitting seismic waves and collecting and analyzing reflected seismic waves, while towing the streamers.

* * * * *